US012670469B2

(12) United States Patent
Moulinec

(10) Patent No.: US 12,670,469 B2
(45) Date of Patent: Jun. 30, 2026

(54) SYSTEM FOR MONITORING MOVEMENT OF A PLURALITY OF CONTAINERS

(71) Applicant: VERSA, Saint-Renan (FR)

(72) Inventor: Jacques Moulinec, Brest (FR)

(73) Assignee: VERSA, Saint-Renan (FR)

( * ) Notice: Subject to any disclaimer, the term of this patent is extended or adjusted under 35 U.S.C. 154(b) by 187 days.

(21) Appl. No.: 18/573,053

(22) PCT Filed: Mar. 29, 2022

(86) PCT No.: PCT/EP2022/058286
§ 371 (c)(1),
(2) Date: Dec. 21, 2023

(87) PCT Pub. No.: WO2022/268371
PCT Pub. Date: Dec. 29, 2022

(65) Prior Publication Data
US 2024/0296417 A1 Sep. 5, 2024

(30) Foreign Application Priority Data
Jun. 21, 2021 (FR) ...................................... 2106565

(51) Int. Cl.
*G06Q 10/087* (2023.01)
*G06K 7/10* (2006.01)
(Continued)

(52) U.S. Cl.
CPC ....... *G06Q 10/087* (2013.01); *G06K 7/10297* (2013.01); *G06K 7/10435* (2013.01);
(Continued)

(58) Field of Classification Search
CPC ............. G06Q 10/087; G06K 7/10297; G06K 7/0435; G06K 19/06009; G06K 19/0723; G06K 7/1408
See application file for complete search history.

(56) References Cited

U.S. PATENT DOCUMENTS

2018/0114597 A1* 4/2018 Grabiner .............. G07G 1/0054
2020/0265446 A1 8/2020 Vargas

FOREIGN PATENT DOCUMENTS

CN 112001972 A * 11/2020 ............. G06N 3/045

OTHER PUBLICATIONS

Anonymous; Automatic Barcode reading on Pallets in motion; Jun. 16, 2015; p. 1; Vitronic.*

(Continued)

*Primary Examiner* — Ariel J Yu
*Assistant Examiner* — Denisse Y Ortiz Roman
(74) *Attorney, Agent, or Firm* — H&I PARTNERS; Chai Im; C. Andrew Im

(57) ABSTRACT

A system to monitor the movement of a plurality of containers including at least one terminal having a photographic device. Each container includes an identification code. The first terminal extracts and decodes the identification code of each container before sending the photograph of that container to a database. A flash connected to the photographic device is triggered during photographing of the container. A controller, including a microcontroller, controls the system and the database. At least one photograph is processed by a processing unit to identify the identification code of each container and to generate a list of the recognized identification codes. A display screen and a trigger to activate the photographing of the containers. The system triggers the photographing during the movement of the container support by a movement element.

14 Claims, 5 Drawing Sheets

(51) Int. Cl.
    *G06K 7/14*        (2006.01)
    *G06K 19/06*     (2006.01)
    *G06K 19/07*     (2006.01)

(52) U.S. Cl.
    CPC ..... *G06K 7/1408* (2013.01); *G06K 19/06009*
               (2013.01); *G06K 19/0723* (2013.01)

(56)             References Cited

OTHER PUBLICATIONS

Vitronic, "Automatic Barcode Reading on Pallets in motion," Jun. 16, 2015, p. 1.

* cited by examiner

SYSTEM FOR MONITORING MOVEMENT OF A PLURALITY OF CONTAINERS

RELATED APPLICATIONS

This application is a § 371 application of PCT/EP2022/058286 filed Mar. 29, 2022, which claims priority from French Patent Application No. 2106565 filed Jun. 21, 2021, each of which is incorporated herein by reference in its entirety.

TECHNICAL FIELD OF THE INVENTION

The present invention relates to a system for monitoring movement of a plurality of containers. It applies in particular to all businesses, and public or private bodies using pallets as a handling or packaging unit or any other container support that can be handled in the same way as a pallet (handling by pallet truck) on or in which one or more containers are located.

The term "pallet" used in this document covers any type of container support that can be handled by a handling machine with forks (pallet truck, manual or electric, forklift truck, stacker, transit system, etc.), it may be a case of wooden pallets, plastic pallets, metal pallets, box pallets, (wood, plastic, cardboard, mesh) etc.

A few types of standard pallet among the most usual have dimensions of A×B with A being a dimension of between 100 mm and 2500 mm and B being a dimension of between 100 mm and 2500 mm. This therefore includes all the dimensions of conventional pallets of 600 mm by 800 mm or 800 mm by 1000 mm, of 1000 mm by 1000 mm, of 1100 mm by 1100 mm, of 1200×1200 mm, usually of 1200 mm by 800 mm, etc.

The containers can be of all types of packages or box or tub in all the forms and in all the materials and in which merchandise or goods of all kinds or non are located.

BACKGROUND OF THE INVENTION

One of the aims of the invention is to automatically trace the presence or movements of a plurality of containers.

Knowledge of the information relating to the quantity of goods contained in a container or a trailer or at a location in a warehouse is useful information for optimizing the transport flows in a logistic distribution system. This information is useful after the manufacture or creation of the pallet with its various containers or at each loading and unloading operation and over the long term to optimize the filling rates.

Making checks or inventories and reports by the handing operators is known. This method, in addition to being tedious, does not allow real-time monitoring of the transport of goods.

Making manual checks on the correct presence of the containers, or of a good number of containers, or of correct categories of containers on a container support is known, either visually with respect to a preestablished list, or manually using a scanner or barcode reader connected to a computer system, requiring many identical, tedious operations that are subject to errors.

Making manual or visual or human quality checks to compare an order preparation with a preestablished list of orders is known. The length and the variety of the list give rise to human errors.

Creating a computer object of the virtual container support type when a physical container support with its containers has been prepared by palletizing operators or robots or any automated mechanical method for passing containers onto a predefined container support is known, but these systems do not align the computer information with the physical reality of what is on the container support (a container may fall without being seen or leave the list of containers on a container support).

Producing photographs by smartphone and reports by the handling operators is known. This method, in addition to being tedious, does not allow real-time surveillance of the monitoring of the transport of goods, and gives rise to errors (photographs of poor quality and shots that are not systematic according to the time of the operators).

For monitoring the transport of goods, a prior technique consists in using a laser-beam barcode reader. The drawbacks of this technique are that the reading zone must be less than 1 meter in height, the barcode reader is not reliable (of the order of 30% of barcodes are not read) and there is no proof of loading or unloading.

For example, the document XP055585446, "Automatic Barcode reading on Pallets in motion", of the company Vitronic (registered trademark), of 16 Jun. 2015, page 1, is known. This document shows the automatic reading by a terminal positioned in proximity to a point where the platform, in other words container supports, passes, allowing automatic reading at constant speed of barcodes, the dimensions of which are at least greater than 0.35 mm.

This type of solution is not satisfactory since it does not adapt to just any barcodes and the reading speed is optimized by the constant speed; in other words it is possible to have errors in interpretation of the barcodes if the operator stops and does not comply with the speed of the system. In addition, the containers are not identified in this system, only caused by the identification of the container support, and the qualification is therefore not reliable.

Another problem with this type of technique is the large number of barcode readers necessary (usually one per operator).

None of the current solutions makes it possible to respond to all the needs required, namely providing known monitoring of the quantity and of the unitary identification and weight of the containers.

OBJECT AND SUMMARY OF THE INVENTION

The present invention aims to remedy these drawbacks with a completely innovative approach.

More precisely, the objective of the invention is to provide a signed monitoring, i.e., with an image or film or any other captured multimedia object (point cloud, etc.) including dated information with at least the date and time for each photograph or film or any other captured multimedia object.

One objective of the invention is to provide such a technique that can be adapted easily to existing systems.

These objectives, as well as others that will emerge hereinafter, are achieved by means of a system for monitoring movement of a plurality of containers including at least one first terminal positioned in proximity to a point where the containers pass, each container includes an identification code and is positioned on a container support, said system being remarkable in that the first terminal includes:
   a photographing device, of the camera type, or any other type of cloud capture equipment, configured for photographing at the moment that a container support passes in front of said first terminal, said first terminal extracts and decodes the identification code of each container before sending said photograph to a database;

a flash, or any other continuous or instantaneous lighting device, connected to the photographing device triggering during the photographing;

a control unit, including a microcontroller controlling the system and said database, a unit for processing at least one photograph to identify the identification code of each container and to create a list of recognized identification codes, the data processing unit associates a unique item of information with the photographing data; a display screen, a unit for triggering the photographing according to at least one movement-detection cell, said system triggers said photographing during the movement of the container support by a movement device;

the data of at least one photograph are compared with data in the database, or creates the data in the database if they do not exist, by the processing unit adapted to recognize the numbers and forms of the containers or point clouds or of the photograph or photographs, and associates them with the unique item of information;

the unit for processing the data associates time information with the photographing data.

According to one example, the triggering of the photographing is a manual triggering or triggering by a signal received by the system.

According to one example, the identification code is a barcode or QR code (quick response code, registered trade mark), or according to one example the identification code is a 1D barcode.

According to one example the container support is a pallet.

Thus, the system makes it possible to detect presence or to follow the movement of a plurality of containers.

The unit for processing data and photographs recognizes via various shape and point-cloud recognition technologies, including artificial intelligence. Artificial intelligence is a comparison by learning of a plurality of shapes or point clouds and makes it possible to automatically recognize the numbers and forms of the containers and associates them with a unique item of information with the photographing data and the characteristics of the container.

The advantages of the system according to the configurations are:

increasing the satisfaction of customers and partners, and consolidating the quality image of the company by supplying the correct containers on the correct supports;

increasing the quality and excellence of palletizations (and distribution of the containers on container supports), and consequently of loading, unloading and stock monitoring;

appreciably reducing the time for checking these operations;

reallocating intermediate stock or quality-control areas by focusing it on a few terminals;

fluidifying the associated goods flows without increasing the number of operators necessary;

automatically calculating quality indices relating to the presence of the containers on the container supports: conformity of the articles, of the batches, of the rounds or sub-rounds, of the variable weights, palletization plan (layers/stacks), positionings not read, intrusions, duplicates, stacked pallets, compliance with contract date, return because of date, use before date/best before date, etc., creating, in the information systems in a few seconds, a "container support" computer object connected to the list of unitary identifications of the containers that are physically on the container support.

The invention is advantageously implemented according to the embodiments and variants described below, which are to be considered individually or in accordance with any technically operative combination.

According to one embodiment, the movement element is a conveyor or turntable or a truck of any type for transporting container supports, or a transit system or a travelling belt.

Depending on the configuration, it is a conveyor or a turntable, or a film-wrapping turntable.

In one embodiment, said system includes a module for unique identification of the container included in at least one of the following elements:

barcode or QR code (quick response code, registered trade mark) identification label of the wave emission, radiofrequency partial or total emission or reception or reflection of the RFID (radio frequency identification) type, integrated in the container;

unique identity card integrated in the container;

a unique reference to a database formed by an ordered blockchain, integrated in the container and legible or detectable from outside by a wave system.

The system further includes a tamper-evident unique identification module for unique and certain traceability of the container, one with 3 different systems from: a barcode or QR code identification label, by wave emission, radiofrequency partial or total emission or reception or reflection, of the RFID type, integrated in the container, unique identity card integrated in the container, a unique reference to a database formed by an ordered blockchain, integrated in the container and legible or detectable from outside by a wave system of any type.

The system according to the invention interacts with a network, referred to as a private network, that hosts in a distributed manner a database formed by an ordered blockchain, and associated with a read/write protocol and cryptographic validation of transactions made on the private network. Such a database is better known by the term block chain, which is used throughout hereinafter.

The speed of the movement element is more than 0.01 m/s. In general, the speed is of the order of 0.25 m/s to 5 m/s.

By virtue of these provisions, the system makes it possible to have irrefutable quality proof of the order preparation and containers.

The concept of unique information a counter that never takes the same value twice. This makes it possible to manage uniqueness of the identifications.

The concept of unique information is different with the identification code of each container. This is because each identifier has a theoretically unique code. However, in the event of a problem, it may be that there are two of them alike. It is the same thing in the case of standard parcels.

In one embodiment, the processing unit compares the list of identification codes of each container with a theoretical list of the identification codes of the containers contained in the database, when there is a difference then the system indicates an incident on the display screen.

In one embodiment, the processing unit compares the list of identification codes of each container with a theoretical list of the identification codes of the containers contained in the database (8), when there is a difference then the system indicates an incident on the display screen.

In one example, the processing unit deciphers the identification codes of each container, collects them in the form of a list, and creates a theoretical list of the identification codes of the containers associated with the container support in the database (8).

In one embodiment, the system includes a module for communicating data with a data transceiver (12) making the information from the processing unit accessible remotely.

In one embodiment, the first terminal is positioned on one side of the movement element, the system includes a second terminal positioned on the other side of the movement element, the second terminal includes:

a photographing device, of the camera type, or any other type of point-cloud capture equipment, configured for photographing at the moment a container support passes in front of said second terminal, said second terminal extracts and decodes the identification code of each container before sending said photograph to a database (8);

a flash, or any other continuous or instantaneous lighting device, connected to the photographing device (21) triggering during the photographing;

a control unit (1), including a microcontroller (3) controlling the system and said database, a unit for processing at least one photographing to identify the identification code of each container and to create a list of recognized identification codes, the data processing unit (5) associates a unique item of information with the photographing data; a unit for triggering the photographing according to at least one movement detection cell (4), said system triggers said photographing during the movement of the container support by a movement device with synchronization with the first terminal by the control unit (1);

the data of at least one photograph are compared with data in the database, or creates the data in the database if they do not exist, by the processing unit (5) adapted to recognize the numbers and forms of the containers or point clouds or of the photograph or photographs, and associates them with the unique item of information;

the unit for processing the data associates time information with the photographing data.

According to another example for the second terminal, the control unit (1) includes a display screen.

In one embodiment, said system furthermore includes between three and six terminals positioned around the movement element, each terminal includes:

a photographing device, of the camera type, or any other type of point-cloud capture equipment, configured for photographing at the moment a container support passes in front of said terminal, said terminal extracts and decodes the identification code (6) of each container before sending said photograph to a database (8);

a flash (2), or any other continuous or instantaneous lighting device, connected to the photographing device (21) triggering during the photographing;

a control unit (1), including a microcontroller (3) controlling the system and said database (8), a unit for processing at least one photographing to identify the identification code (6) of each container and to create a list of recognized identification codes, the data processing unit (5) associates a unique item of information with the photographing data; a unit for triggering the photographing according to at least one movement detection cell (4), said system triggers said photographing during the movement of the container support by a movement element with synchronization with one of the other terminals by the control unit (1);

the data of at least one photograph are compared with data in the database, or creates the data in the database if they do not exist, by the processing unit (5) adapted to recognize the numbers and forms of the containers or point clouds or of the photograph or photographs, and associates them with the unique item of information;

the unit for processing the data associates time information with the photographing data.

In one embodiment, the movement element is located on the terminal (20) or on the system of terminals that move along, on either side or around any type of container support.

In one embodiment, when an indicator of the database (8) exceeds a predefined threshold, said system furthermore includes:

an alarm module including an alarm device (23) cooperating with the control unit (1) to send an incident report to a management terminal (19) or a database (8), said alarm device (23) being audible, visual or silent, the management terminal (19) having access to at least one data item in the database (8).

According to one example, the predefined threshold is exceeded when the list of identification codes checked by the photographing and the theoretical list contained in the database (8) are different.

In one embodiment, said system furthermore includes a module for volume processing of the containers, by processing by the data processing unit (5) and the database (8).

In one embodiment, said system furthermore includes a real-time data processing module configured for giving an indicator of change in a parameter of the containers, such as radiation, visual without tearing, smell, moisture, the weight of the container support, or detection of gas.

In one embodiment, the system includes an integrated device (10) for traceability of the internal or external physical measurements positioned in at least one of the containers, said integrated device (10) is configured to give an indicator of change in a parameter of the containers, said parameter being radiation, visual without tearing, smell, humidity, the weight of the container support, or detection of gas.

BRIEF DESCRIPTION OF THE FIGURES

Other advantages, aims and features of the present invention will emerge from the following description made, for an explanatory and in no way limitative purpose, with regard to the accompanying drawings, in which.

DESCRIPTION OF EMBODIMENTS

Figures 1, 2:
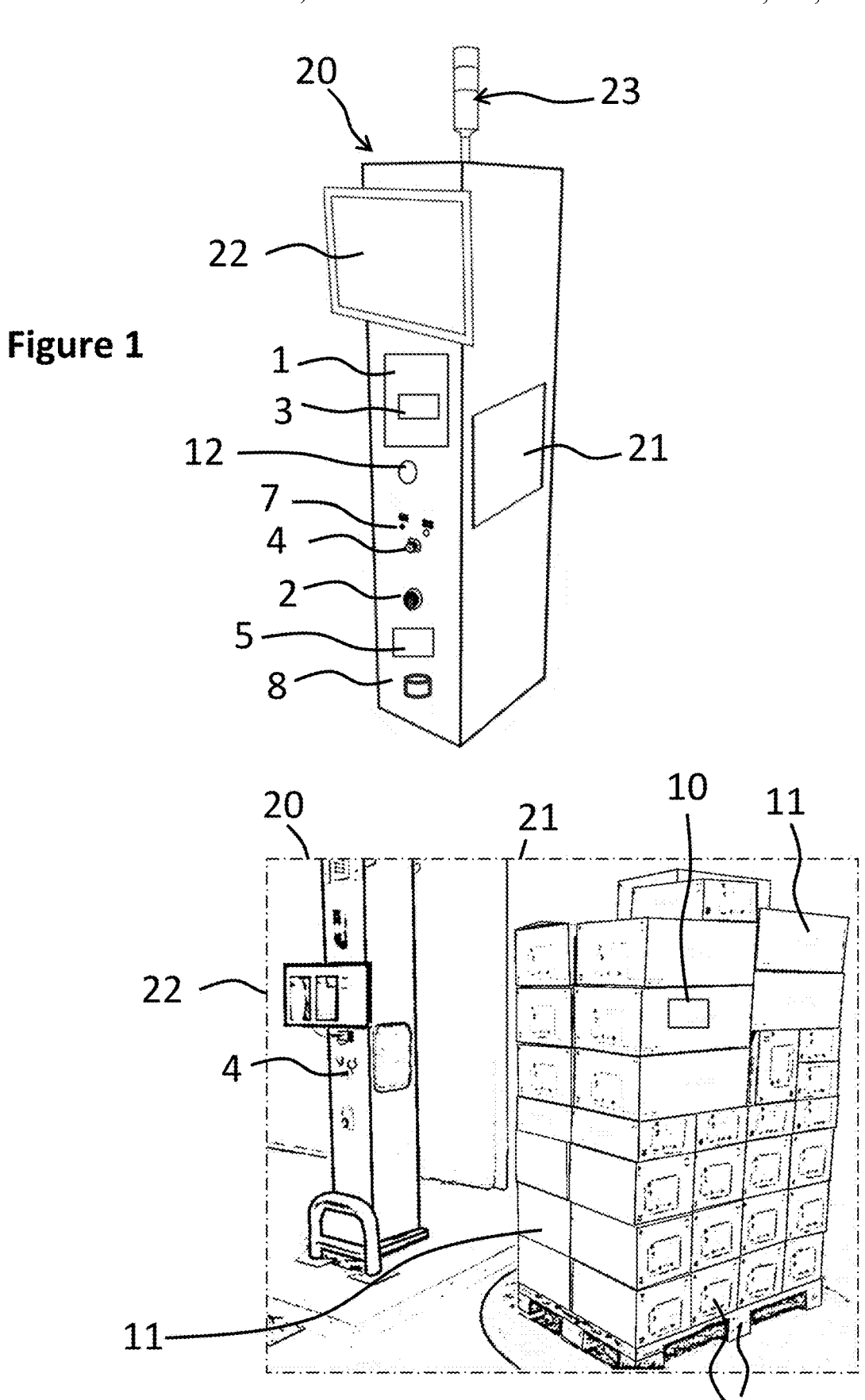
FIG. 1 shows a terminal of the system that is the object of the present invention.
FIG. 2 shows the principle of the invention with a diagram showing the terminal in front of a pallet on which parcels are placed.

The system makes it possible to check before dispatch, to check on reception, or to make a declaration during a movement in packaging or in stock by virtue of the automatic acquisition and decoding of barcodes or weight identification codes (6) on 1 to 6 faces of the pallet.

The system can consist of 1 to 7 masts (or terminals) that are either horizontal or vertical according to the quality checks and indicators to be made on the presence of a container (11) on the container supports.

According to a variant, when a film or photograph or any other multimedia object is shot, parallel calculations of physical measurements are made and associated with the action of checking the container support.

The container (11) has an integrated system for traceability of the physical measurements (calorific energy and quantities making it possible to measure it, light energy and quantities make it possible to measure it, electrostatic energy and quantities making it possible to measure it, electrical energy and quantities making it possible to measure it, potential gravity energy and the quantities making it possible to measure it, kinetic energy and quantities making it possible to measure it, radiation energy and quantities making it possible to measure it, etc.).

There is a physical measurement of the visual state, it is then possible to compare an image taken with a measured image and thus the KPI (key performance indicators) physical spectrum is measured. The aim is to see the containers (11) but also to take physical measurements in parallel and to associate these various data with the checking of the containers (11) on a container support (e.g., radiation, visual without tearing, smell, moisture, weight of the container support, detection of gases, etc.).

The system also makes it possible to substitute for tests on multiple creations of container supports that contain a list of containers, e.g.: creation of pallets in the information system after having created it physically with parcels. Before the operation the pallet does not exist physically or from a digital point of view, after the operation the physical pallet is created and the system enters it automatically in the information system according to what there actually is in the pallet (rather than according to what should have appeared on the pallet—for example parcels may be lacking; or the operator may have placed additional parcels).

The system makes it possible to:

check in real time that the correct parcels and the correct goods are on the correct palette; container and container support automate the acquisition of the parcel SSCC (serial shipping container code) or parcel identifiers and associate them with the pallet SSCC of the support on which the parcels are located;

archive one or more views (e.g., photographs) that are proof of the presence of the correct parcels on the correct palette to allow rational treatment of exceptions or disputes.

Archive the proof of quality of the containers on the container support at the time of preparation or when a terminal moves from one physical place to another physical place.

According to one example, the present system is integrated in a flow of goods with the rotary film-wrapping turntable. The check is made before the film-wrapping phase.

The systems proposed consist of a mast (or terminal) with a height of 2 m to 2.50 m, incorporating the following equipment one or more high-definition sensors;

1 central computer unit;

1 touch screen type 22 inch with multidirectional fixing 1 wireless barcode scanner for degraded mode;

1 operator-alert messenger a connection to an internal or external portal that archives all the evidence and indicative KPI created during the entry or the checking pass.

FIG. 1 shows a terminal (20) of the system. The terminal (20) is shown at a height of approximately 2.00 m to 2.50 m and is placed in proximity to the point where the pallets pass (loading/unloading dock of a warehouse, stock entry/exit doors).

The system incorporates mainly one or more photographic devices (21).

According to one variant, the photographic device (21) is an industrial color camera. This camera is coupled with integrated lighting.

According to a variant, the photographic device (21) is an HD photographic apparatus, a camera, a volume sensor, a sound or ultrasound sensor, etc., a heat sensor or a radiation sensor.

The system also incorporates a flash (2), a computer or microcontroller (3) or automaton or a control unit (1) or a movement-detection sensor (4).

The photographic device is positioned in each of the 1 to 7 various masts (terminals).

According to a variant, at least one photographic device (21) is on a gantry.

The unit for triggering (7) the photographing is, according to a variant, operated manually by a button or other element connected to the triggering unit (7).

At the terminal (20) there is a screen (22) for displaying information. Above the terminal (20) there is a luminous messenger 23 (indicator lights).

FIG. 2 shows the principle of the invention with a diagram showing the terminal (20) in front of a pallet on which parcels are placed.

The screen (22) for seeing the photograph or photographs can be seen. The photographing device (21) positioned in front of the monitoring zone. In this case, the monitoring zone is the turntable (9).

The mast/pallet distance in the diagrams is given by way of indication for pallets with a maximum height of 2.40 m (apart from the wooden pallet), i.e. approximately 2.60 m in total. It is adjusted according to the tests on site and the configuration of the workplace.

The system is normally used at the end of the order preparation and before dispatch (or when taking into stock and taking out of the packaging in the option).

It is also used on unloading to have a fine validity of the containers (11) on a container support.

At these various process levels, the possible architectures are the same. The only change is the interpretation of the data when the data are processed.

In order to check the four faces of the pallets, we use a standard film-wrapping turntable. Once the pallet has been checked, the film-wrapping phase is implemented.

Through the interface on the screen 22, the operator initiates the cycle to be implemented:

checking the two faces 80, or checking the two faces 120, or checking the four faces checking the top or bottom face checking the faces judged to be relevant for configuring the system.

The system makes it possible:

to read the barcode of each parcel present on the pallet, on 1 to 6 visible faces;

to take photographs of each face of the pallet and to archive them;

to check the conformity of the composition of the pallet (the case of a pre-dispatch check) by means of the interface with the ERP (enterprise resource planning) order preparation software also sometimes called IMS (integrated management software);

to automate and safeguard the transfer of the parcel data to the ERP (the case of a check at the end of production) and to associate the parcel codes with the pallet SSCC.

In a variant, the system can process pallets with a height of 2.40 m.

According to another variant, 1D (one dimension) or 2D (two dimensions) codes are used.

Figure 3:
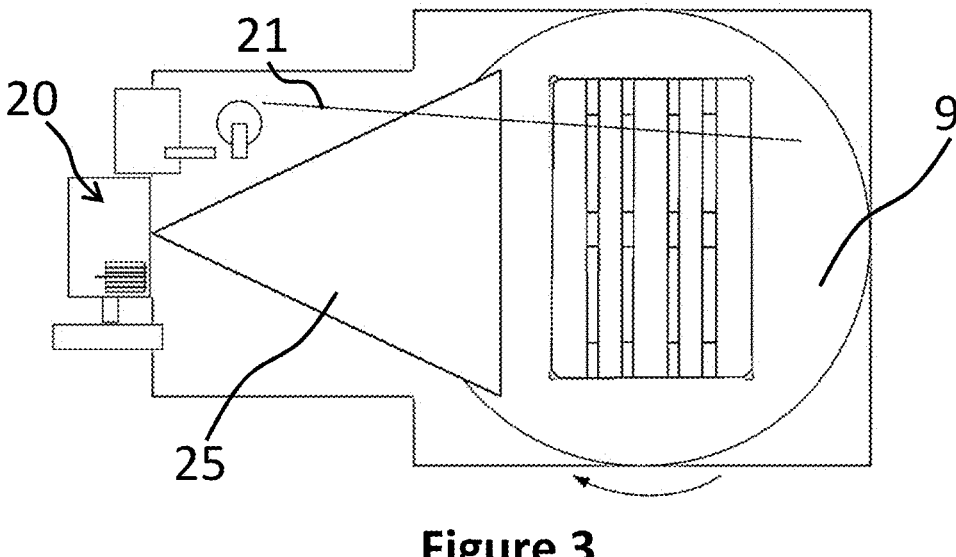
FIG. 3 shows a terminal with a turntable and the step of filming the pallet.

FIG. 3 shows the step of film-wrapping the pallet.

According to one example, there are two cycles: a first cycle corresponds to making up the pallet or container support with containers (11). The second cycle corresponds to another phase with the reception of a made-up pallet, and unitary checking of the correct things on the already existing pallet.

The film-wrapping phase is a plastic film 24 that is represented by a line arriving towards the palate. The triangle 25 represents the field of view of the photographing device.

The arrow indicates the direction of rotation of the turntable.

Figure 4:
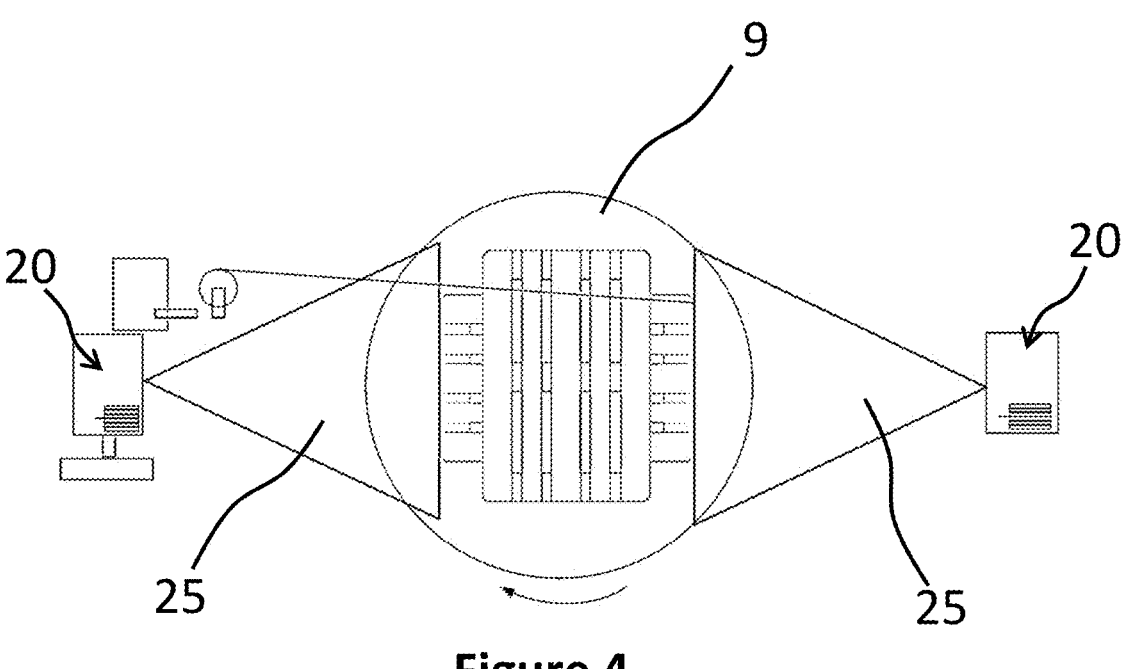
FIG. 4 shows a variant of the system with not a single terminal but two terminals positioned on each side of the turntable.

FIG. 4 shows a variant of the system with not a single terminal but two terminals 20 positioned on each side of the turntable. The arrow indicates the direction of rotation of the turntable.

The above explanations apply in the present case, the only change is the interpretation of the data with regard to the software since there are two terminals.

In order to check the four faces of the pallets on which the labels are, we use a synchronization with the turntable. Then, if the check is OK, the film-wrapping phase is implemented. This is an option with 1 or more terminals.

According to another variant, not shown, the system includes 6 terminals: 4 vertical and 2 horizontal at the top, and one bottom horizontal for below.

Figure 5:
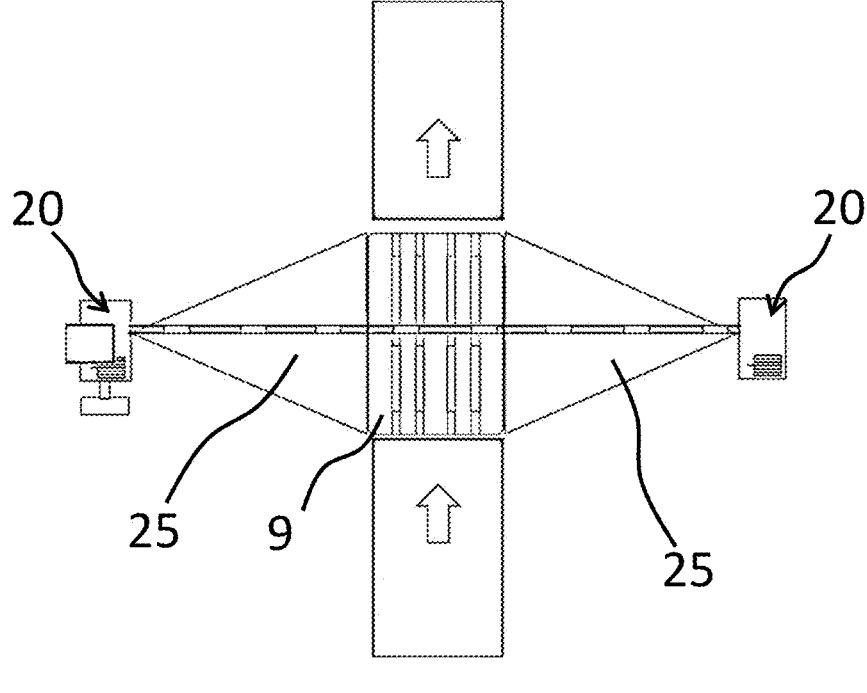
FIG. 5 shows a variant of the system with not a single terminal but two terminals positioned on each side of the conveyor.

FIG. 5 shows a conveyor. The arrows indicate the direction of the conveyor. There are two terminals 20 positioned on each side of the conveyor. The triangles 25 show the field of view of the photographing device.

The above explanations apply in the present case, the only change is the interpretation of the data with regard to the software since there are two terminals.

In order to check the two faces of the pallets on which the labels are, we use a synchronization with the conveyor that brakes, if possibly until it stops, but this is not necessary, the pallet in front of the terminals for checking. Then, if the check is OK, it presents the pallet for film wrapping.

If the check is not OK, then the pallet, not film wrapped, goes directly into a conveyor queue to be re-presented in order preparation to correct the palletization errors.

To assist themselves, the operator can have access to a screen that will, in augmented reality, give the errors to be corrected (parcel too many) and the list of missing or unread parcels.

Once the palletization is corrected, the operator will be able to re-present at the conveyor entry the pallet the quality of which is retested.

The connections with the conveyor will be connections of the automaton type.

Here are other aspects of the system:

The terminals are connected to the control unit (1) in real time and make it possible to have an alert in the case of a detected fault. For example, this real-time alert allows blocking of the process to correct the error before dispatch or film wrapping.

The initiation of the photographing is automatic.

According to a variant, the triggering of the photographing is driven by multiple events: button, data, automaton, presence, any type of event (not only a passage in front of a sensor).

The data processing allows advanced reading, and not only of the identification codes (6) or barcodes (6), but palletization plans, stack plans, and quality intelligence on the palletization plans.

The system makes it possible to detect the number of boxes or containers (11) by identifying form or logo, not only by barcodes.

Data processing allows counting of the number of parcels or containers (11) by comparison with data in the database.

Data processing makes it possible to identify 1 pallet or even 3 pallets being pushed (differentiates them).

Data processing makes it possible to identify a certain number of stacked pallets.

Data processing makes it possible to identify the physical or virtual sub-pallets on a pallet.

Data processing makes it possible to identify not only the parcels on the pallets but also the fineness of storage, of subsets (stacked or pushed pallets, or storage subsets going as far as the stack). By comparison with a database (8), the storage is optimized or directs the operator towards a better storage.

The system makes it possible to check in real time the theoretical order of storage of the parcels on pallets, stacked or not.

The system makes it possible to identify anything missing (not only reading what there is).

The system makes it possible to have a link with a customer database.

The system makes it possible to provide all the aspects of logistics checks such as the quality of loading at dispatch, monitoring personnel, end-to-end traceability, quality of transport, palletization quality, checking reception unloading, buffer stock, packaging quality, order preparation, access to a secure evidence portal, automation of box flows.

The system makes it possible to have one terminal, two terminals or 3 or 4 or 5 for the top, 6 for the bottom. In this way, it is possible to have photographing on 6 faces.

The system is discriminating: detection of multiple containers (11) on 1 pallet support.

The system allows counting of layers of parcels of certain formats (for example one pallet makes 20 layers of boxes in height).

Thus the system makes it possible:

to guarantee, if there is no parcel barcode, to have established quantities to check that there is no hole in height (for example no parcel on the face being read, but just one parcel on the second level).

The system is configured to work when it is very cold (freezer temperatures—(−26° C.).

The system is configured to work for temperatures from 50 to 60° C.

The system is configured to be synchronized with the turntable.

The system is configured to be synchronized with the smart truck according to the messages from the transit system.

The system is configured to extract measurements and volumes.

The system is configured to have indicators of measurement of verticality in order subsequently to avoid falls during movements (avoiding Towers of Pisa of boxes on a pallet).

The system is configured to identify pallet supports and the recognition and number thereof: Europe pallet, chep, Delaize, Super-U, etc. (registered trademarks).

The system is configured to identify failure to read (more powerful than reading: it is known what is read, it is also known what is not read or which it has not been possible to read-transmission of information in the flow).

The system is configured to identify the volume and to identify the surface area on the ground.

The system is configured to archive quality controls in a cloud portal (access to a remote database) or locally.

The system is configured to operate in 1D, in 2D or only parcel (identification of the logos or layers of boxes/parcels).

In a variant, the mast or masts take 1 to 6 photographs asynchronously and then reconstitute them by reconstituting the list of containers on the container support.

In a variant, the mast or masts take 1 to 6 photographs synchronously and then reconstitute them by reconstituting the list of containers on the container support.

Figure 6:
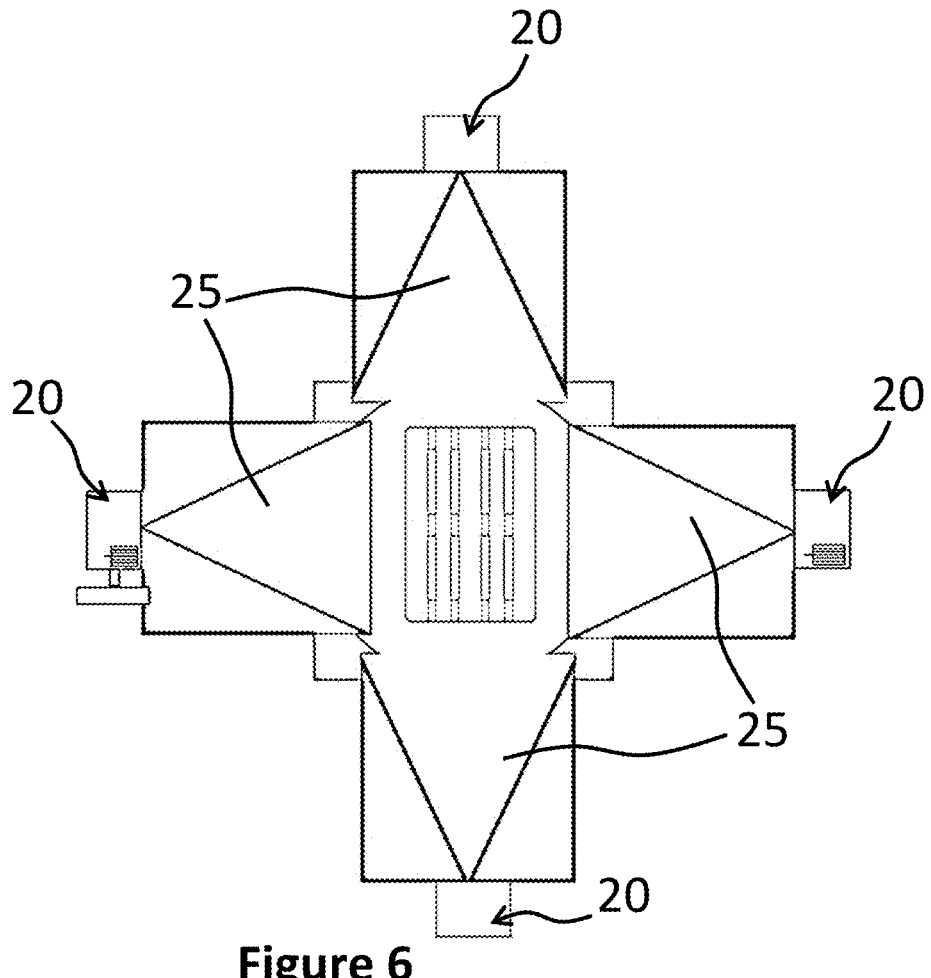
FIG. 6 shows a variant of the system with four terminals.

FIG. 6 shows a variant of the system with four terminals and sufficient passage for a pallet on a truck. The triangles 25 represent the field of view of the photographic device.

Figure 7:
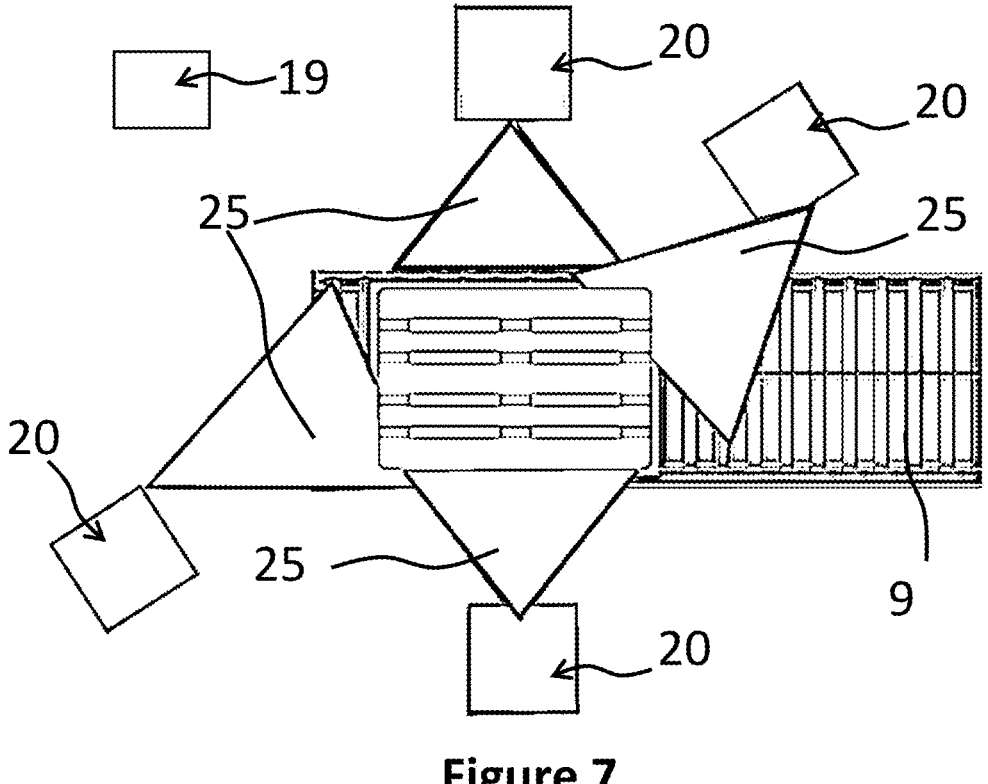
FIG. 7 shows a variant of the four-terminal system and sufficient passage for a conveyor of the travelling belt or transit system type.

FIG. 7 shows a variant of the four-terminal system and sufficient passage for a conveyor of the travelling belt or transit system type. It may also be a case of another movement element (conveyor, pallet transit system, etc.). The triangles 25 represent the field of view of the photographic device.

LIST OF REFERENCE SIGNS

TABLE 1

| References | Designations |
| --- | --- |
| 1 | Control unit |
| 2 | Flash |
| 3 | Microcontroller |
| 4 | Movement-detection cell |
| 5 | Processing unit or data processing unit |
| 6 | Identification code |
| 7 | Trigger unit |
| 8 | Database |
| 9 | Movement element, e.g., turntable, conveyor, etc. |
| 10 | Integrated device |
| 11 | Container |
| 12 | Data transceiver |
| 19 | Management terminal |
| 20 | Terminal |
| 21 | Photographic device |
| 22 | Screen |
| 23 | Messenger |
| 24 | Plastic film |
| 25 | Photographic-device field-of-view triangle |

The invention claimed is:

1. A system to monitor movement of a plurality of containers comprising at least one terminal positioned in proximity to a point where said plurality of containers pass, each container is positioned on a container support and each container comprises an identification code, said at least one terminal comprising:
a photographic device configured to photograph at a moment the container support passes in front of said at least one first terminal, said at least one terminal extracts and decodes the identification code of said each container before storing a photograph of the container support in a database;
a flash, connected to the photographic device, being activated during the photographing;
a control unit, comprising a microcontroller to control the system and the database, the control unit configured to process at least one photograph to identify the identification code of said each container and to generate a list of recognized identification codes, the control unit associates a unique item of information with data of said at least one photograph;
a display screen;
the photographic device is triggered by a detection by at least one movement-detection cell;
the system triggers said photographing during the movement of the container support by a movement device;
the control unit compares the data of said at least one photograph with data stored in the database or stores the data of said at least one photograph in the database if the data of said at least one photograph do not exist in the database, the control unit is configured to recognize and associate numbers and forms of said plurality of containers or point clouds or of the photograph or photographs with the unique item of information;
the control unit associates time information with the data of said at least one photograph to provide a real-time surveillance and signed monitoring of said plurality of containers with said at least one photograph of each container and the time information associated with the data of said at least one photograph;
wherein the identification code is a unique reference to the database formed by an ordered blockchain, integrated in said each container and legible or detectable from outside by a wave system; and
wherein the control unit is configured to provide, in real-time, an indicator of change in a parameter of said plurality of containers, the parameter being one of the following: radiation, visual without tearing, smell, moisture, a weight of the container support, or a detection of gas.

2. The system of claim 1, wherein the movement device is one of the following: a conveyor, a turntable, a truck for transporting container supports, a transit system and a travelling belt.

3. The system of claim 1, wherein the photographic device is a camera.

4. The system of claim 1, wherein the photographic device is a cloud capture equipment.

5. The system of claim 1, wherein the flash is a continuous or instantaneous lighting device.

6. The system of claim 1, wherein the identification code further comprises at least one of the following:
a barcode or quick response (QR) code identification label, integrated in each container, of a wave emission, a partial or total radiofrequency emission, a radio frequency identification (RFID) reception or reflection; and
a unique identity card integrated in said each container.

7. The system of claim 1, wherein the control unit compares the list of identification codes of said each container with a theoretical list of the identification codes of said plurality of containers in the database, an incident alert is displayed on the display screen in response to a determination that there is a difference between the list and the theoretical list.

8. The system of claim 1, wherein said at least one terminal further comprising a data transceiver to exchange data and to make the data from the control unit accessible remotely.

9. The system of claim 1, further comprising two terminals: a first terminal and a second terminal, the first terminal being positioned on one side of the movement device and the second terminal positioned on other side of the movement device.

10. The system of claim 9, further comprising between three and six terminals positioned around the movement device.

11. The system of claim 1, wherein the movement device is located on said at least one terminal or on a system of movable terminals, on either side or around the container support.

12. The system of claim 1, further comprising an alarm device cooperating with the control unit to send an incident report to a management terminal or the database when an indicator of the database exceeds a predefined threshold, the alarm device being audible, visual or silent, and the management terminal having access to at least one data item in the database.

13. The system of claim 1, wherein the control unit and the database are configured to bulk process said plurality of containers.

14. The system of claim 1, wherein the photographic device further comprises at least one of the following sensors: a volume sensor, a sound sensor, a ultrasound sensor, a heat sensor and a radiation sensor.

* * * * *